US008169199B2

(12) United States Patent
Okamura et al.

(10) Patent No.: US 8,169,199 B2
(45) Date of Patent: May 1, 2012

(54) POWER SUPPLY WITH OVERVOLTAGE PROTECTION BY ZERO CURRENT STAGNATION DETECTION

(75) Inventors: Masaki Okamura, Toyota (JP); Kiyotaka Matsubara, Ichinomiya (JP); Shungo Tamura, Okazaki (JP); Hiroki Ohtani, Aichi-gun (JP); Hideo Nakai, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 545 days.

(21) Appl. No.: 12/227,638

(22) PCT Filed: May 22, 2007

(86) PCT No.: PCT/JP2007/060458
§ 371 (c)(1),
(2), (4) Date: Jul. 15, 2009

(87) PCT Pub. No.: WO2007/138935
PCT Pub. Date: Dec. 6, 2007

(65) Prior Publication Data
US 2009/0302818 A1    Dec. 10, 2009

(30) Foreign Application Priority Data
Jun. 1, 2006    (JP) ................................. 2006-153874

(51) Int. Cl.
*G05F 1/46* (2006.01)
(52) U.S. Cl. ......... 323/222; 323/271; 323/283; 323/285
(58) Field of Classification Search .................. 323/222, 323/271, 282, 283, 284, 285, 286, 287
See application file for complete search history.

(56) References Cited

U.S. PATENT DOCUMENTS

| 7,135,840 | B2 * | 11/2006 | Kirchner et al. | 323/222 |
| 7,180,274 | B2 * | 2/2007 | Chen et al. | 323/222 |
| 7,598,715 | B1 * | 10/2009 | Hariman et al. | 323/271 |
| 7,638,994 | B2 * | 12/2009 | Hane et al. | 323/285 |
| 7,782,037 | B2 * | 8/2010 | Ohtani et al. | 323/284 |
| 7,795,849 | B2 * | 9/2010 | Sohma | 323/271 |
| 7,812,575 | B2 * | 10/2010 | Shimada et al. | 323/222 |
| 7,869,233 | B2 * | 1/2011 | Okamura et al. | 363/41 |
| 8,008,899 | B2 * | 8/2011 | Heim et al. | 323/222 |
| 2004/0056642 | A1 | 3/2004 | Nebrigic et al. | |
| 2006/0022655 | A1 * | 2/2006 | Nakai et al. | 323/282 |
| 2006/0145677 | A1 * | 7/2006 | Okamura | 323/283 |
| 2009/0128117 | A1 * | 5/2009 | Ochiai et al. | 323/299 |
| 2009/0146588 | A1 * | 6/2009 | Okamura | 318/139 |

(Continued)

FOREIGN PATENT DOCUMENTS
JP    A-9-47027    2/1997
(Continued)

*Primary Examiner* — Jeffrey Sterrett
(74) *Attorney, Agent, or Firm* — Oliff & Berridge, PLC

(57) ABSTRACT

It is determined that a periodic zero current stagnation state is reached to correct a voltage command of a smoothing capacitor downward by a predetermined voltage when a state where a current (reactor current) flowing through a coil in a dead time when switching elements are both off immediately after the switching element (upper arm) is turned off from on stagnates at a value of 0 occurs at switching periods of the switching elements. This can prevent a voltage of the smoothing capacitor from becoming unexpectedly higher than the voltage command in the current stagnation state, prevent the smoothing capacitor from being damaged by an overvoltage and prevent excessive torque from being output from motors.

15 Claims, 9 Drawing Sheets

U.S. PATENT DOCUMENTS

2009/0302818 A1* 12/2009 Okamura et al. ............. 323/284

FOREIGN PATENT DOCUMENTS

| JP | A-2003-528559 | 9/2003 |
| JP | A-2004-120844 | 4/2004 |
| JP | A-2005-51895 | 2/2005 |
| JP | A-2005-151606 | 6/2005 |
| WO | WO 01/71894 A2 | 9/2001 |

* cited by examiner

POWER SUPPLY WITH OVERVOLTAGE PROTECTION BY ZERO CURRENT STAGNATION DETECTION

TECHNICAL FIELD

The present invention relates to a power supply device and a control method thereof, and more particularly to a power supply device that transmits electric power to and from an electrical apparatus and a control method thereof.

BACKGROUND ART

A conventionally proposed power supply device of this type is such that in increasing an electric power from a DC power supply with a converter constituted by two transistors and a reactor and supplying the electric power to an electrical apparatus, an on-duty of an upper arm of the two transistors of the converter is set to 1.0 when a voltage command provided to the electrical apparatus is close to a voltage of the DC power supply (for example, see Patent Document 1). In this device, the on-duty of the upper arm is set to 1.0 when the voltage command provided to the electrical apparatus is close to the voltage of the DC power supply, thereby preventing vibration of an output voltage caused by the fact that the on-duty of the upper arm cannot be ensured because of the need for ensuring a dead time for preventing the two transistors from being simultaneously turned on.
[Patent Document 1] Japanese Patent Laid-Open No. 2005-51895

DISCLOSURE OF THE INVENTION

In a device that increases the voltage of the DC power supply with the converter and supplies the voltage to the electrical apparatus like the above described power supply device, an output voltage on a boost side sometimes becomes higher or lower than the voltage command for a short time when a direction of a current from the DC power supply changes. When the output voltage becomes lower than the voltage command, an output of the electrical apparatus becomes slightly insufficient, which causes few problems, while when the output voltage becomes higher than the voltage command, a smoothing capacitor on the boost side may be damaged to cause excessive outputs of the electrical apparatus.

A power supply device and a control method thereof according to the present invention have an object to prevent an output voltage from unexpectedly becoming higher than a voltage command. The power supply device and the control method thereof according to the present invention have another object to prevent damage to smoothing electronic equipment such as a smoothing capacitor. The power supply device and the control method thereof according to the present invention have a further object to prevent excessive outputs of an electrical apparatus that transmits electric power to and from the power supply device.

The power supply device and the control method thereof according to the present invention adopt the following units to achieve at least one of the above described objects.

The present invention direct to a power supply device that transmits electric power to and from an electrical apparatus, the power supply device including:
 a DC power supply;
 a boost converter that includes a first switching element connected in series with the electrical apparatus when viewed the DC power supply, a second switching element connected in series with the first switching element and connected in parallel to the electrical apparatus when viewed the DC power supply, and a reactor connected to a middle point between the first switching element and the second switching element and to an output terminal of the DC power supply, and can adjust on times of the switching elements at predetermined periods to increase a voltage of the DC power supply and supply the voltage to the electrical apparatus;
 a voltage smoothing unit that is connected in parallel to the electrical apparatus when viewed the boost converter and smoothes a voltage applied to the electrical apparatus;
 a zero current stagnation state detecting module that detects a periodic zero current stagnation state where a zero current stagnation state, where a reactor current flowing through the reactor stagnates at a value of 0, occurs at the predetermined periods; and
 a control unit that controls the boost converter on the basis of a voltage command that is a target value of the voltage applied to the electrical apparatus and the periodic zero current stagnation state detected by the zero current stagnation state detecting module.

In the power supply device of the present invention, the periodic zero current stagnation state is detected where the zero current stagnation state, where the reactor current flowing through the reactor in the boost converter stagnates at the value of 0, occurs at the predetermined periods of turning on/off the switching elements, and the boost converter is controlled on the basis of the voltage command that is the target value of the voltage applied to the electrical apparatus and the detected periodic zero current stagnation state. This can accommodate the periodic zero current stagnation state, and prevent an output voltage on the boost side from becoming higher than the voltage command by the periodic zero current stagnation state. This can prevent damage to the voltage smoothing unit caused by the output voltage becoming higher than the voltage command, and prevent excessive outputs of the electrical apparatus. The electrical apparatus may be any apparatus that can transmit electric power to and from the power supply device. The voltage smoothing unit may include a smoothing capacitor.

In the power supply device of the present invention, the zero current stagnation state detecting module may include a power supply voltage detecting module that detects a power supply voltage that is a voltage of the DC power supply, and a second switch voltage detecting module that detects a second switch voltage that is a inter-terminal voltage of the second switching element, and detect the periodic zero current stagnation state, regarding a state where a difference between the detected power supply voltage and the detected second switch voltage is a predetermined voltage or lower as the zero current stagnation state. The zero current stagnation state detecting module may include a smoothing inter-terminal voltage detecting module that detects a smoothing inter-terminal voltage that is a inter-terminal voltage of the voltage smoothing unit, and a second switch voltage detecting module that detects a second switch voltage that is a inter-terminal voltage of the second switching element, and detect the periodic zero current stagnation state, regarding a state where a difference between the detected smoothing inter-terminal voltage and the detected second switch voltage is a first predetermined voltage or higher and the detected second switch voltage is a second predetermined voltage or higher at the predetermined periods as the zero current stagnation state. Further, the zero current stagnation state detecting module may include a reactor current detecting module that detects the reactor current, and detect the periodic zero current stagnation state, regarding a state where the detected reactor current becomes a value of 0 at the predetermined periods as the zero current stagnation state. In these cases, the zero current stagnation state detecting module may detect the periodic zero current stagnation state when the zero current stagnation state occurs more than once. This can ensure detection of the periodic zero current stagnation state and prevent false detection.

In the power supply device of the present invention, the control unit may control the boost converter on the basis of the voltage command when the periodic zero current stagnation state is not detected by the zero current stagnation state detecting module, and controls the boost converter on the basis of a post-correction voltage command corrected to reduce the voltage command when the periodic zero current stagnation state is detected by the zero current stagnation state detecting module. This can prevent the output voltage on the boost side from becoming higher than the voltage command when the periodic zero current stagnation state is detected.

In the power supply device of the present invention of an aspect where the boost converter is controlled on the basis of the post-correction voltage command when the periodic zero current stagnation state is detected, the control unit may determine a direction of a polarity change of the reactor current and control the boost converter on the basis of the determined direction of the polarity change. In this case, the control unit may determine the direction of the polarity change on the basis of operation states of the first switching element and the second switching element. Further, the control unit may determine that the reactor current has changed in polarity from a current for discharging the DC power supply to a current for charging the DC power supply when the zero current stagnation state occurs in a dead time when the first switching element and the second switching element are both off immediately after the first switching element is turned off from on and thus the zero current stagnation state detecting module detects the periodic zero current stagnation state, and determines that the reactor current has changed in polarity from the current for charging the DC power supply to the current for discharging the DC power supply when the zero current stagnation state occurs in a dead time immediately after the second switching element is turned off from on and thus the zero current stagnation state detecting module detects the periodic zero current stagnation state. In these cases, the control unit may control the boost converter on the basis of the post-correction voltage command when determining that the reactor current has changed in polarity from the current for discharging the DC power supply to the current for charging the DC power supply, and control the boost converter on the basis of the voltage command, despite the detection of the periodic zero current stagnation state, when determining that the reactor current has changed in polarity from the current for charging the DC power supply to the current for discharging the DC power supply. This can prevent an excessive reduction in output electric power on the boost side when the reactor current changes in polarity from the current for charging the DC power supply to the current for discharging the DC power supply.

In the power supply device of the present invention, the control unit may control the boost converter on the basis of the post-correction voltage command corrected to reduce the voltage command in a specific zero current stagnation state where the zero current stagnation state occurs in the dead time when the first switching element and the second switching element are both off immediately after the first switching element is turned off from on and thus the zero current stagnation state detecting module detects the periodic zero current stagnation state, and controls the boost converter on the basis of the voltage command when not in the specific zero current stagnation state. This can prevent the output voltage on the boost side from becoming higher than the voltage command in the specific zero current stagnation state.

The present invention is directed to a control method of a power supply device, the control method including:
  a DC power supply;
  a boost converter that includes a first switching element connected in series with an electrical apparatus that transmits electric power when viewed the DC power supply, a second switching element connected in series with the first switching element and connected in parallel to the electrical apparatus when viewed the DC power supply, and a reactor connected to a middle point between the first switching element and the second switching element and to an output terminal of the DC power supply, and can adjust on times of the switching elements at predetermined periods to increase a voltage of the DC power supply and supply the voltage to the electrical apparatus; and
  a voltage smoothing unit that is connected in parallel to the electrical apparatus when viewed the boost converter and smoothes a voltage applied to the electrical apparatus,
  the control method including the steps of:
  (a) determining whether the power supply device is in a periodic zero current stagnation state where a zero current stagnation state, where a reactor current flowing through the reactor stagnates at a value of 0, occurs at the predetermined periods, and
  (b) controlling the boost converter on the basis of a voltage command that is a target value of the voltage applied to the electrical apparatus when it is determined that the power supply device is not in the periodic zero current stagnation state, and controlling the boost converter on the basis of a post-correction voltage command corrected to reduce the voltage command when it is determined that the power supply device is in the periodic zero current stagnation state.

In the control method of the power supply device of the present invention, it is determined whether the power supply device is in the periodic zero current stagnation state where the zero current stagnation state, where the reactor current flowing through the reactor of the boost converter stagnates at the value of 0, occurs at the predetermined periods of turning on/off the switching elements. When it is determined that the power supply device is not in the periodic zero current stagnation state, the boost converter is controlled on the basis of the voltage command that is the target value of the voltage applied to the electrical apparatus that transmits the electric power, and when it is determined that the power supply device is in the periodic zero current stagnation state, the boost converter is controlled on the basis of the post-correction voltage command corrected to reduce the voltage command. This can accommodate the periodic zero current stagnation state, and prevent the output voltage on the boost side from becoming higher than the voltage command by the periodic zero current stagnation state. This can prevent damage to the voltage smoothing unit caused by the output voltage becoming higher than the voltage command, and prevent excessive outputs of the electrical apparatus. The electrical apparatus may be any apparatus that can transmit electric power to and from the power supply device. The voltage smoothing unit may include a smoothing capacitor.

In the control method of the power supply device of the present invention, the Step (b) may be the step of controlling the boost converter on the basis of the post-correction voltage command when the zero current stagnation state occurs in a dead time when the first switching element and the second switching element are both off immediately after the first switching element is turned off from on and thus it is determined that the power supply device is in the periodic zero current stagnation state, and controlling the boost converter on the basis of the voltage command, despite the power supply device being in the periodic zero current stagnation state, when the zero current stagnation state occurs in a dead time immediately after the second switching element is turned off from on and thus it is determined that the power supply device is in the periodic zero current stagnation state. This can prevent an excessive reduction in output electric power on the boost side in the periodic zero current stagnation state caused by the zero current stagnation state occurring in the dead time immediately after the second switching element is turned off from on.

BEST MODE FOR CARRYING OUT THE INVENTION

Figure 1:
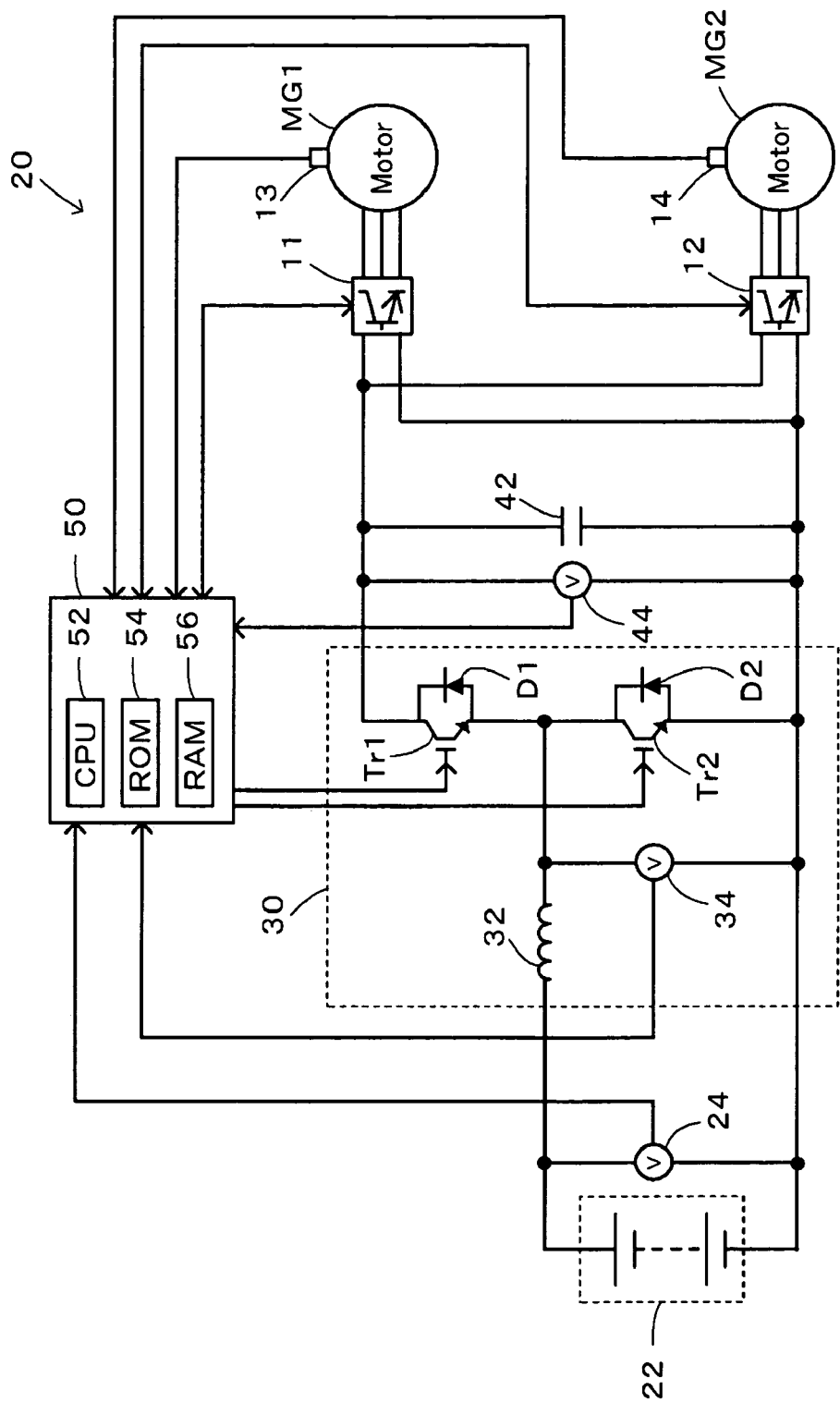
FIG. 1 is a schematic block diagram of a configuration of a power supply device 20 according to an embodiment of the present invention.

Now, the best mode for carrying out the present invention will be described with reference to an embodiment. FIG. 1 is a schematic block diagram of a configuration of a power supply device 20 according to the embodiment of the present invention. As shown, the power supply device 20 of the embodiment is connected to two motors MG1 and MG2 as electrical apparatuses via inverters 11 and 12, and includes a battery 22 as a DC power supply, a boost converter 30 that increases a voltage of the battery 22 and supplies the voltage to the two motors MG1 and MG2, or reduces a voltage of the motors MG1 and MG2 and supplies the voltage to the battery 22, a smoothing capacitor 42 that is placed on a boost side (on the side of the two motors MG1 and MG2) of the boost converter 30 and smoothes a voltage on the boost side, and an electronic control unit 50 that controls the entire device.

The battery 22 is configured as a chargeable-dischargeable secondary battery such as a lithium ion battery or a nickel hydrogen battery.

The boost converter 30 is a known one including two gate-type switching elements (for example, MOSFETs) Tr1 and Tr2 placed in series on a positive electrode bus line and a negative electrode bus line of the inverters 11 and 12 in parallel to the smoothing capacitor 42, two diodes D1 and D2 mounted in parallel to the switching elements Tr1 and Tr2 so as to maintain the voltage, a coil 32 mounted between the middle of the two switching elements Tr1 and Tr2 and a positive electrode of the battery 22. Hereinafter, the switching element Tr1 is referred to as an "upper arm", and the switching element Tr2 is referred to as a "lower arm" in some cases.

The electronic control unit 50 is configured as a microprocessor including a CPU 52, a ROM 54 that stores a processing program, a RAM 56 that temporarily stores data, and unshown input/output ports and communication ports. To the electronic control unit 50, a battery voltage Vb from a voltage sensor 24 mounted between output terminals of the battery 22, a lower arm voltage Vo from a voltage sensor 34 mounted between terminals of the switching element Tr2, a capacitor voltage Vh from a voltage sensor 44 mounted between terminals of the smoothing capacitor 42, or the like are input via the input ports. From the electronic control unit 50, switching signals to the switching elements Tr1 and Tr2 of the boost converter 30 are output from the output ports. The electronic control unit 50 functions as a control unit of the power supply device 20 and also functions as a drive control unit of the two motors MG1 and MG2. Thus, to the electronic control unit 50, rotation positions of rotors from rotation position sensors 13 and 14 mounted to the motors MG1 and MG2 and phase currents applied to the motors MG1 and MG2 from unshown current sensors mounted to the inverters 11 and 12, or the like are input via the input ports, and from the electronic control unit 50, switching signals to the inverters 11 and 12 or the like are output via the output ports.

The two motors MG1 and MG2 are configured as known synchronous generator motors that can be driven as generators and also as motors, and transmit electric power to and from the battery 22 via the inverters 11 and 12 and the boost converter 30.

Figure 2:
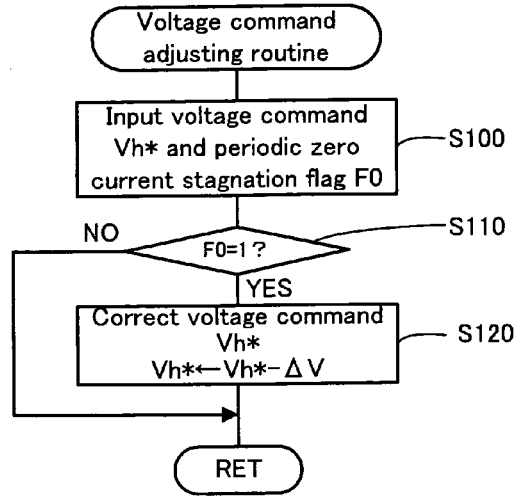
FIG. 2 is a flowchart showing an example of a voltage command adjusting routine performed by an electronic control unit 50.

Next, an operation of the power supply device 20 thus configured will be described. The operation of the power supply device 20 is basically performed by controlling switching of the switching elements Tr1 and Tr2 of the boost converter 30 so that the capacitor voltage Vh becomes a voltage command Vh* for smoothly supplying and receiving the electric power between the battery 22 and the two motors MG1 and MG2. In the power supply device 20 of the embodiment, a voltage command adjusting routine in FIG. 2 is performed for the voltage command Vh* to correct the voltage command Vh*. Specifically, in the voltage command adjusting routine, the voltage command Vh* and a periodic zero current stagnation flag F0 are input that are set by an unshown voltage command setting routine on the basis of driving states of the two motors MG1 and MG2 and a torque command, or the like (Step S100), the periodic zero current stagnation flag F0 is checked (Step S110), when the periodic zero current stagnation flag F0 is a value of 0, the routine is finished without correcting the voltage command Vh*, when the periodic zero current stagnation flag F0 is a value of 1, a value obtained by subtracting a predetermined voltage ΔV from the set voltage command Vh* is corrected as a corrected voltage command Vh* (Step S120), and the routine is finished. The periodic zero current stagnation flag F0 is set to the value of 1, determining that the power supply device 20 is in the periodic zero current stagnation state when a state where a current (reactor current) IL flowing through the coil 32 in a dead time when the switching elements Tr1 and Tr2 are both off immediately after the switching element Tr1 (upper arm) is turned off from on stagnates at a value of 0 (zero current stagnation state) occurs at switching periods of the switching elements Tr1 and Tr2, and set to the value of 0 when a predetermined time has elapsed from the setting to the value of 1. The periodic zero current stagnation flag F0 is set by a periodic zero current stagnation flag setting processing in FIG. 3.

When the periodic zero current stagnation flag setting processing is performed, the CPU 52 of the electronic control unit 50 first inputs the battery voltage Vb from the voltage sensor 24 and the lower arm voltage Vo from the voltage sensor 34 (Step S200), and checks the value of the periodic zero current stagnation flag F0 (Step S210). When the periodic zero current stagnation flag F0 is the value of 0, it is determined whether the battery voltage Vb matches the lower arm voltage Vo from whether an absolute value of a difference between the battery voltage Vb and the lower arm voltage Vo is lower than a threshold value Vref (Step S220). The threshold value Vref is set to a small value that can accept detection errors by the sensors. When it is determined that the battery voltage Vb does not match the lower arm voltage Vo, the processing is finished without setting the periodic zero current stagnation flag F0 to the value of 1.

On the other hand, when it is determined that the battery voltage Vb matches the lower arm voltage Vo, it is determined whether the matching of the battery voltage Vb with the lower arm voltage Vo occurs in a dead time when the upper arm is turned off from on (Step S230). When the matching of the battery voltage Vb with the lower arm voltage Vo does not occur in the dead time when the upper arm is turned off from on, the processing is finished without setting the periodic zero current stagnation flag F0 to the value of 1. When the matching of the battery voltage Vb with the lower arm Vo occurs in the dead time when the upper arm is turned off from on, a counter C is incremented by a value of 1 (Step S240), and the value of the counter C is compared with a threshold value Cref (Step 250). The threshold value Cref is used for ensuring the matching of the battery voltage Vb with the lower arm voltage Vo or ensuring that the matching occurs in the dead time when the upper arm is turned off from on, and values of 2, 3, 4, or the like can be used. When the value of the counter C is the threshold value Cref or higher, the periodic zero current stagnation flag F0 is set to the value of 1 (Step S260), and the processing is finished. When the value of the counter C is lower than the threshold value Cref, the processing is finished without setting the periodic zero current stagnation flag F0 to the value of 0. Finding matching of the battery voltage Vb with the lower arm voltage Vo more than once allows determination whether or not the power supply device is in the periodic zero current stagnation state, and the reason of this will be described later.

When it is determined in Step S210 that the periodic zero current stagnation flag F0 is set to the value of 1, it is determined whether a predetermined time has elapsed from the setting of the periodic zero current stagnation flag F0 to the value of 1 (Step S270). When the predetermined time has elapsed, the counter C is reset to the value of 0 (Step S280), the periodic zero current stagnation flag F0 is set to the value of 0 (Step S290), and the processing is finished.

Figure 4:
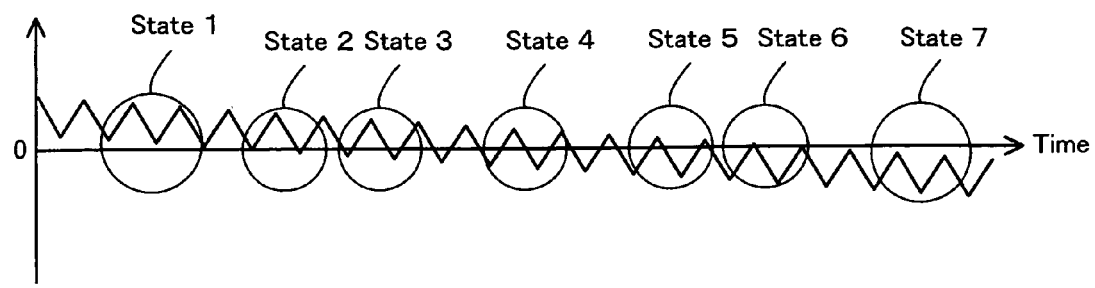
FIG. 4 illustrates changes with time of an ideal and schematic reactor current IL at the time when a reactor current IL flowing through a coil 32 changes from a positive value to a negative value through a value of 0 with a value in discharge from a battery 22 being positive.

FIG. 4 illustrates changes with time of an ideal and schematic reactor current IL at the time when the reactor current IL flowing through the coil 32 changes from a positive value to a negative value through a value of 0 with a value in discharge from the battery 22 being positive. Pulsing of the reactor current IL in the figure is caused by switching periods (carrier frequencies) of the switching elements Tr1 and Tr2. When the reactor current IL changes from the positive value to the negative value, as shown, the reactor current IL changes from a state 1 where the reactor current IL does not become a negative value during pulsing to a state 2 where the reactor current IL slightly becomes a negative value during pulsing, a state 3 where the reactor current IL becomes a further negative value in a dead time during pulsing, a state 4 where the reactor current IL becomes a positive value and a negative value to the same degree during pulsing, a state 5 where a positive value of the reactor current IL is reduced during pulsing, a state 6 where the reactor current IL slightly becomes a positive value during pulsing, and a state 7 where the reactor current IL does not become a positive value during pulsing. FIGS. 5 to 11 illustrate actual changes in upper arm (switching element Tr1), lower arm (switching element Tr2), dead time, reactor current IL, and lower arm voltage Vo in the states 1 to 7.

Figure 5:
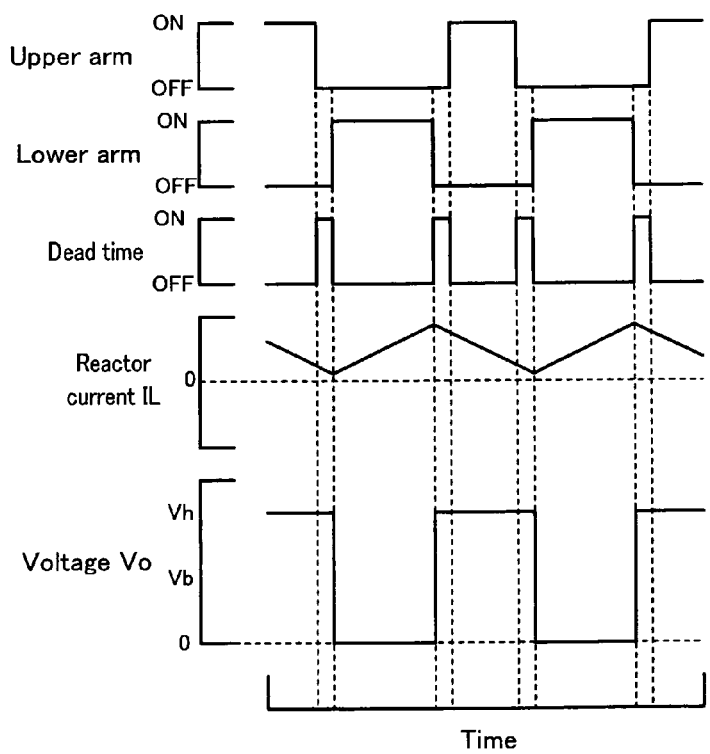
FIG. 5 illustrates changes in upper arm, lower arm, dead time, reactor current IL, and lower arm voltage Vo in a state 1 where the reactor current IL does not become a negative value during pulsing.

In the state 1, as shown in FIG. 5, the lower arm voltage Vo repeats a capacitor voltage Vh and a value of 0 according to switching between the upper arm (switching element Tr1) and the lower arm (switching element Tr2).

Figure 6:
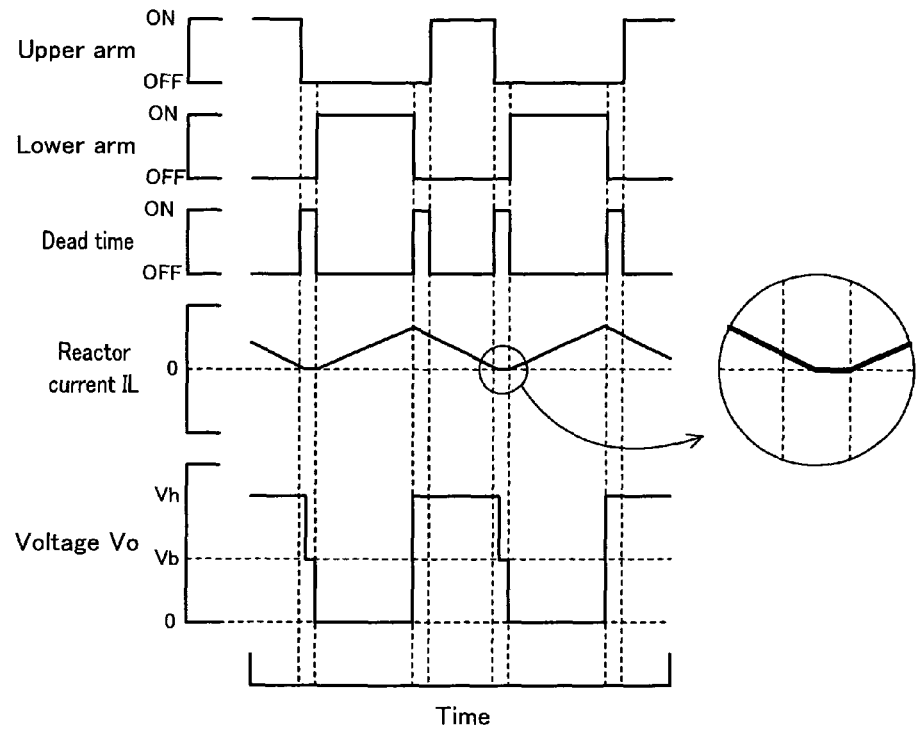
FIG. 6 shows changes in upper arm, lower arm, dead time, reactor current IL, and lower arm voltage Vo in a state 2 where the reactor current IL slightly becomes a negative value during pulsing.

In the state 2, as shown in FIG. 6, the reactor current IL should be a negative value in a dead time when the upper arm (switching element Tr1) is turned off from on, but the switching elements Tr1 and Tr2 are both off and a negative current cannot flow, and the reactor current IL stagnates at the value of 0 (a zero current stagnation state). The zero current stagnation state periodically occurs at carrier frequencies. In the zero current stagnation state, the lower arm voltage Vo matches the battery voltage Vb because the reactor current IL is the value of 0. For this reason, finding matching of the battery voltage Vb with the lower arm voltage Vo more than once allows determination of the periodic zero current stagnation state in the periodic zero current stagnation flag setting processing in FIG. 3. Without the dead time, the lower arm voltage Vo becomes the value of 0 when the reactor current IL becomes the negative value, but with the dead time, the lower arm voltage Vo becomes the battery voltage Vb in the zero current stagnation state, and the voltage of the smoothing capacitor 42 becomes higher than the voltage command Vh*. In the embodiment, the voltage command Vh* is corrected downward by a predetermined voltage ΔV for preventing damages because of an overvoltage of the smoothing capacitor 42 or preventing output torque from the motors MG1 and MG2 from becoming unexpectedly high. The predetermined voltage ΔV can be determined by an experiment or the like from the carrier frequency, the battery voltage Vb, the voltage command Vh*, or the like.

Figure 7:
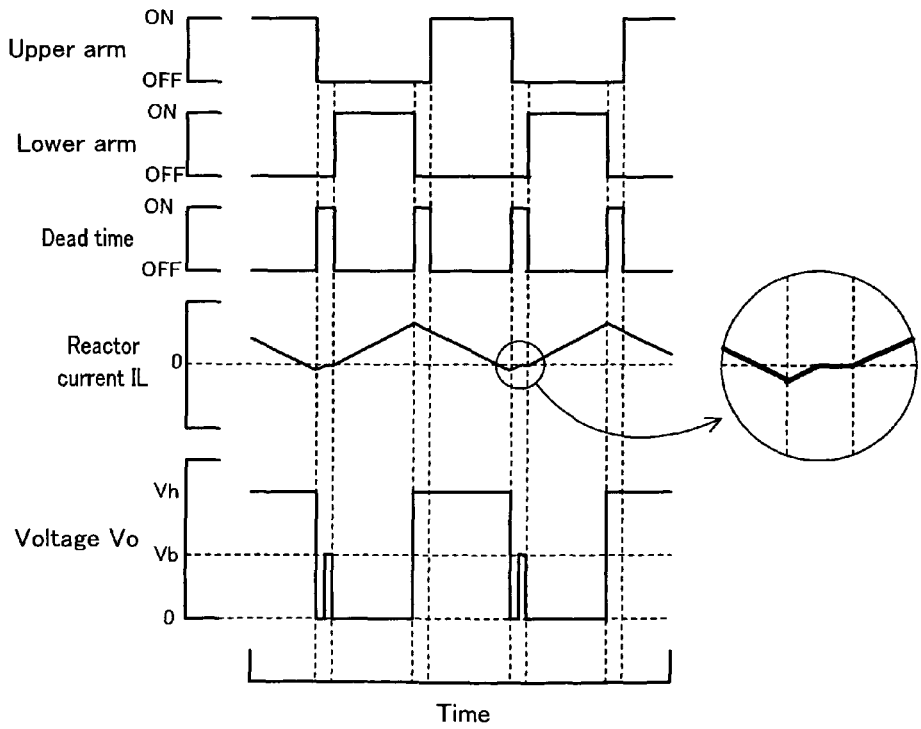
FIG. 7 shows changes in upper arm, lower arm, dead time, reactor current IL, and lower arm voltage Vo in a state 3 where the reactor current IL becomes a further negative value in a dead time during pulsing.

In the state 3, as shown in FIG. 7, the reactor current IL should be a positive value in a dead time when the upper arm (switching element Tr1) is turned off from on, but the switching elements Tr1 and Tr2 are both off and a positive current cannot flow, and the reactor current IL stagnates at the value of 0 (a zero current stagnation state). In the zero current stagnation state, the lower arm voltage Vo should be the value of 0 because the reactor current IL is the value of 0, but the lower arm voltage Vo matches the battery voltage Vb, and the voltage of the smoothing capacitor 42 becomes higher than the voltage command Vh*. In the embodiment, the voltage command Vh* is corrected downward by a predetermined voltage ΔV, thereby preventing an overvoltage of the smoothing capacitor 42. In the embodiment, the counter C is reset to the value of 0 when a predetermined time has elapsed from the setting of the periodic zero current stagnation flag F0 to the value of 1. It is only necessary that this predetermined time is set as time required for passing through the states 2 and 3. The counter C may be reset to the value of 0 when passing through the state 3 instead that the counter C is reset to the value of 0 when the predetermined time has elapsed from the setting of the periodic zero current stagnation flag F0 to the value of 1.

Figure 8:
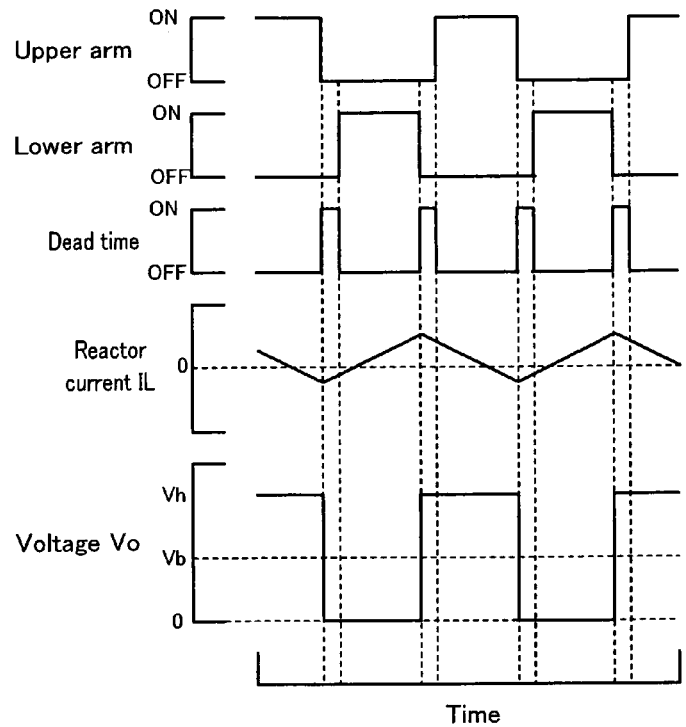
FIG. 8 shows changes in upper arm, lower arm, dead time, reactor current IL, and lower arm voltage Vo in a state 4 where the reactor current IL becomes a positive value and a negative value to the same degree during pulsing.

In the state 4, as shown in FIG. 8, the reactor current IL does not change in polarity in a dead time. Thus, the overvoltage of the smoothing capacitor 42 as described in the states 2 and 3 does not occur.

Figure 9:
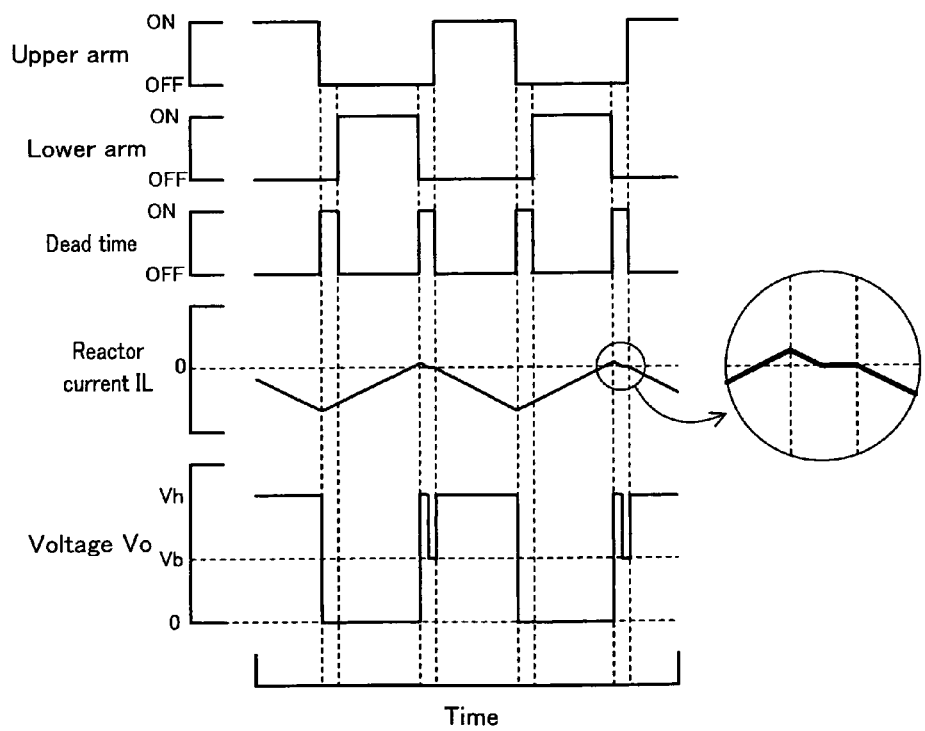
FIG. 9 shows changes in upper arm, lower arm, dead time, reactor current IL, and lower arm voltage Vo in a state 5 where a positive value of the reactor current IL is reduced during pulsing.

In the state 5, as shown in FIG. 9, the reactor current IL should be a negative value in a dead time when the lower arm (switching element Tr2) is turned off from on, but the switching elements Tr1 and Tr2 are both off and a negative current cannot flow, and the reactor current IL stagnates at the value of 0 (a zero current stagnation state). In the zero current stagnation state, the lower arm voltage Vo matches the battery voltage Vb because the reactor current IL is the value of 0, and the voltage of the smoothing capacitor 42 becomes lower than the voltage command Vh*. In the embodiment, even if the voltage of the smoothing capacitor 42 becomes lower than the voltage command Vh*, the degree thereof is small and the voltage command Vh* is used without being corrected. In the state 2, the voltage command Vh* is corrected downward for preventing the voltage of the smoothing capacitor 42 from becoming higher than the voltage command Vh*, while in the state 5, the voltage command Vh* is not corrected upward even if the voltage of the smoothing capacitor 42 becomes lower than the voltage command Vh*. This is because the smoothing capacitor 42 is not damaged even if the voltage of the smoothing capacitor 42 becomes lower than the voltage command Vh*, and upward correction of the voltage command Vh* is not required. Without the upward correction of the voltage command Vh*, the output torque of the motors MG1 and MG2 is slightly reduced, but the degree thereof is small and such a phenomenon occurs in a short time, and thus no serious problem occurs even without the upward correction of the voltage command Vh*.

Figure 10:
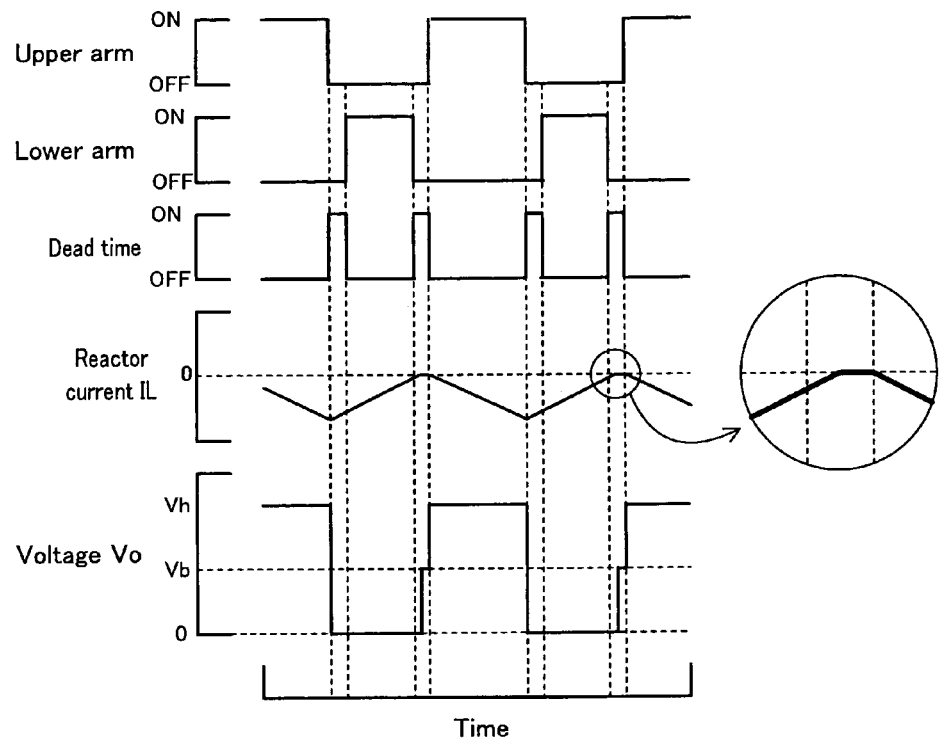
FIG. 10 illustrates changes in upper arm, lower arm, dead time, reactor current IL, and lower arm voltage Vo in a state 6 where the reactor current IL slightly becomes a positive value during pulsing.

In the state 6, as shown in FIG. 10, the reactor current IL should be a positive value in a dead time when the lower arm (switching element Tr2) is turned off from on, but the switching elements Tr1 and Tr2 are both off and a positive current cannot flow, and the reactor current IL stagnates at the value of 0 (a zero current stagnation state). In the zero current stagnation state, the lower arm voltage Vo should be the capacitor voltage Vh because the reactor current IL is the value of 0, but the lower arm voltage Vo matches the battery voltage Vb, and the voltage of the smoothing capacitor 42 becomes lower than the voltage command Vh*. Also in this case, in the embodiment, the smoothing capacitor 42 is not damaged and thus the upward correction of the voltage command Vh* is not performed as in the state 5.

Figure 11:
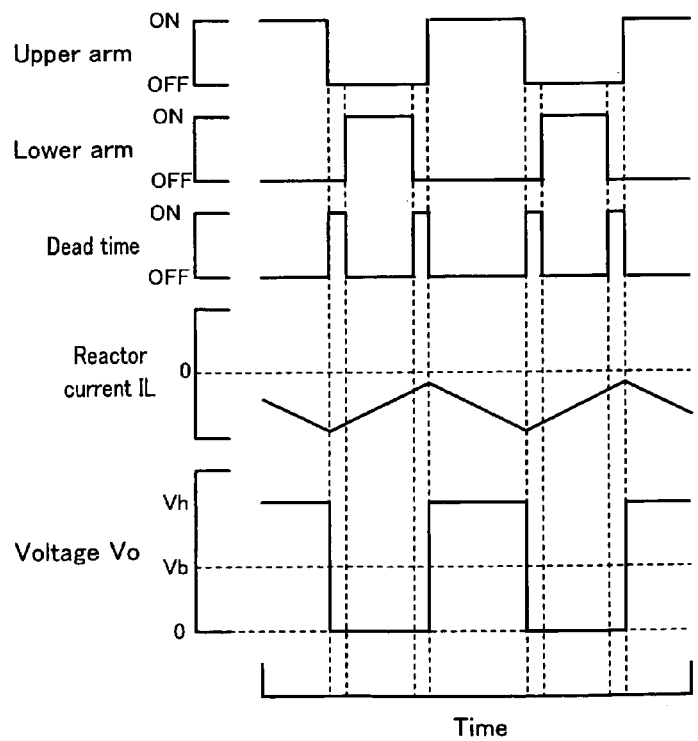
FIG. 11 illustrates changes in upper arm, lower arm, dead time, reactor current IL, and lower arm voltage Vo in a state 7 where the reactor current IL does not become a positive value during pulsing.

In the state 7, as shown in FIG. 11, the lower arm voltage Vo repeats the capacitor voltage Vh and the value of 0 according to switching between the upper arm (switching element Tr1) and the lower arm (switching element Tr2).

Figure 3:
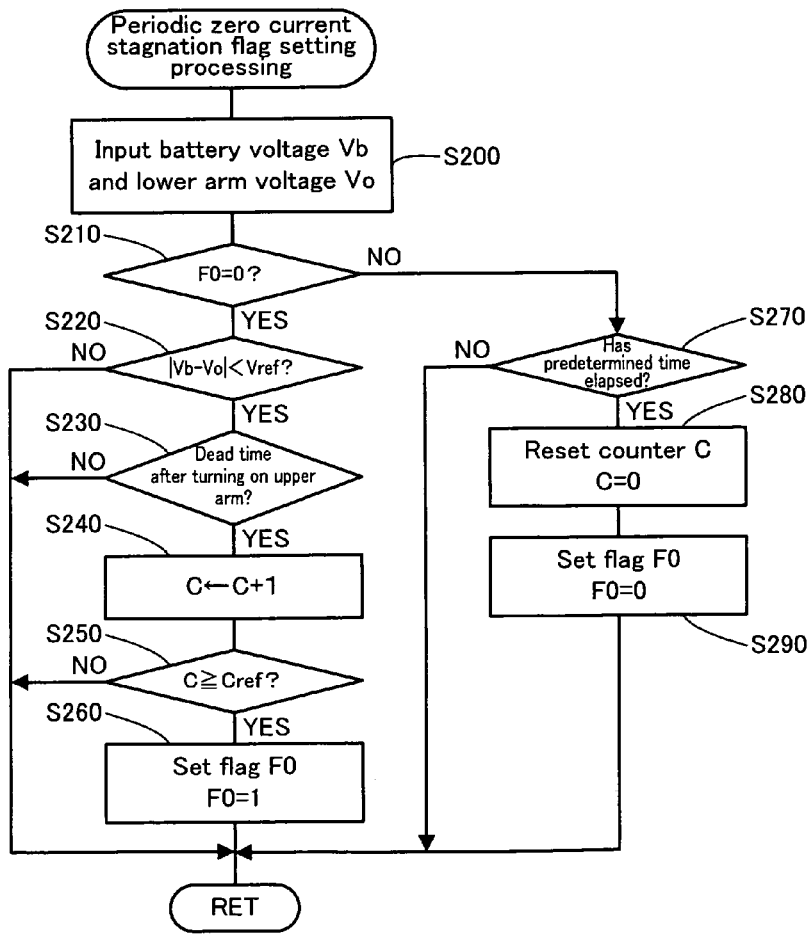
FIG. 3 is a flowchart of an example of a periodic zero current stagnation flag setting processing performed by the electronic control unit 50.

From the above description, in the periodic zero current stagnation flag setting processing in FIG. 3, it is determined that the state 2 is reached by that fact that the number of times of the matching of the battery voltage Vb with the lower arm voltage Vo becomes the threshold value Cref or higher of the counter C to set the periodic zero current stagnation flag F0 to the value of 1, and when the predetermined time as the time required for passing through the states 2 and 3 after the state 2 is reached and the periodic zero current stagnation flag F0 is set to the value of 1, the periodic zero current stagnation flag F0 is reset to the value of 0. In the voltage command adjusting routine in FIG. 2, the voltage command Vh* is corrected downward by the predetermined voltage ΔV for preventing damages by an overvoltage of the smoothing capacitor 42 and excessive outputs of the motors MG1 and MG2 when the periodic zero current stagnation flag F0 is the value of 1.

According to the power supply device 20 of the embodiment described above, when the state where the current (reactor current) IL flowing through the coil 32 in the dead time when the switching elements Tr1 and Tr2 are both off immediately after the switching element Tr1 (upper arm) is turned off from on stagnates at the value of 0 (zero current stagnation state) occurs at the switching periods of the switching elements Tr1 and Tr2, it is determined that the periodic zero current stagnation state is reached, and the voltage command Vh* is corrected downward by the predetermined voltage ΔV, thereby preventing the voltage of the smoothing capacitor 42 from becoming unexpectedly higher than the voltage command Vh* in the periodic zero current stagnation state, preventing the smoothing capacitor 42 from being damaged by the overvoltage and preventing excessive torque from being output from the motors MG1 and MG2. Further, the periodic zero current stagnation state is determined only by the zero current stagnation state in the dead time immediately after the switching element Tr1 (upper arm) is turned off from on, thereby allowing downward correction of the voltage command Vh* only when necessary.

Figure 12:
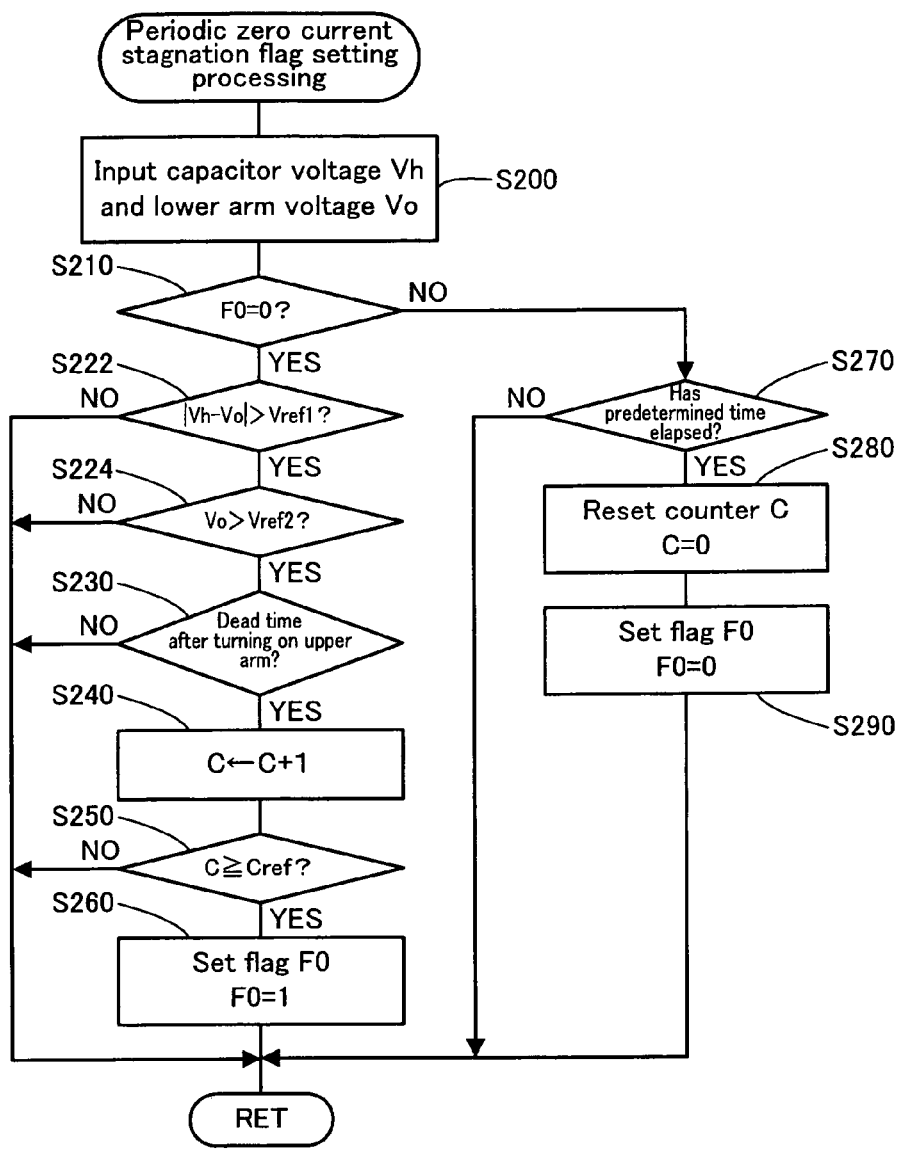
FIG. 12 is a flowchart showing a periodic zero current stagnation flag setting processing of a variant.

In the power supply device 20 of the embodiment, the periodic zero current stagnation state is determined when it is determined that the battery voltage Vb and the lower arm voltage Vo are matched more than once. However, the periodic zero current stagnation state may be determined when it is determined that the matching of the battery voltage Vb with the lower arm voltage Vo does not occur more than once and the lower arm voltage Vo is not the value of 0. In this case, a periodic zero current stagnation flag setting processing in FIG. 12 may be performed instead of the periodic zero current stagnation flag setting processing in FIG. 3. Specifically, it is determined whether the capacitor voltage Vh does not match the lower arm voltage Vo by determining whether an absolute value of a difference between the capacitor voltage Vh and the lower arm voltage Vo is higher than a positive threshold value Vref1 (Step S222), and it is determined whether the lower arm voltage Vo is not the value of 0 by determining whether the lower arm voltage Vo is higher than a positive threshold value Vref2 (Step S224).

Figure 13:
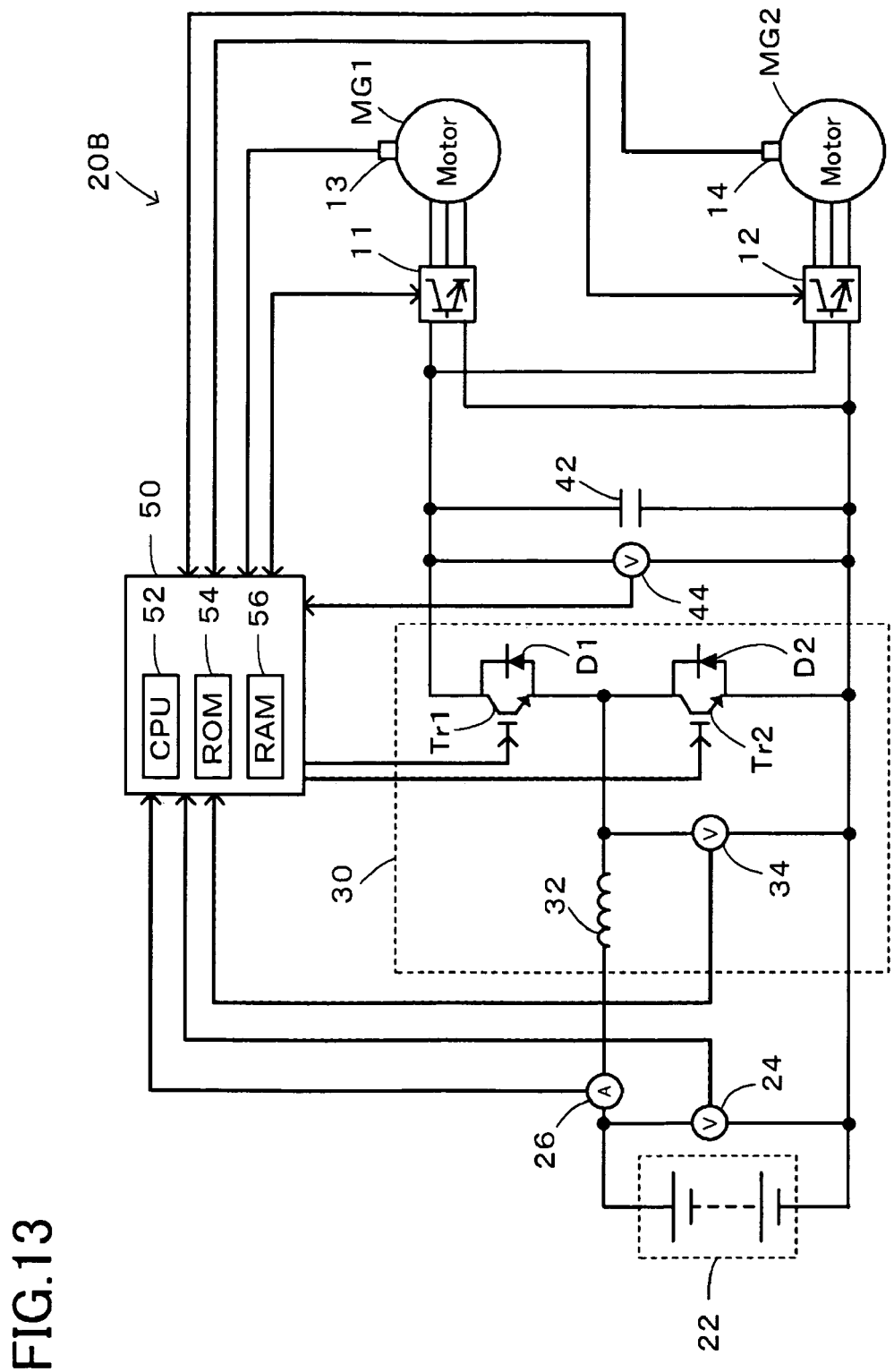
FIG. 13 is a schematic block diagram of a configuration of a power supply device 20B of the variant.
Figure 14:
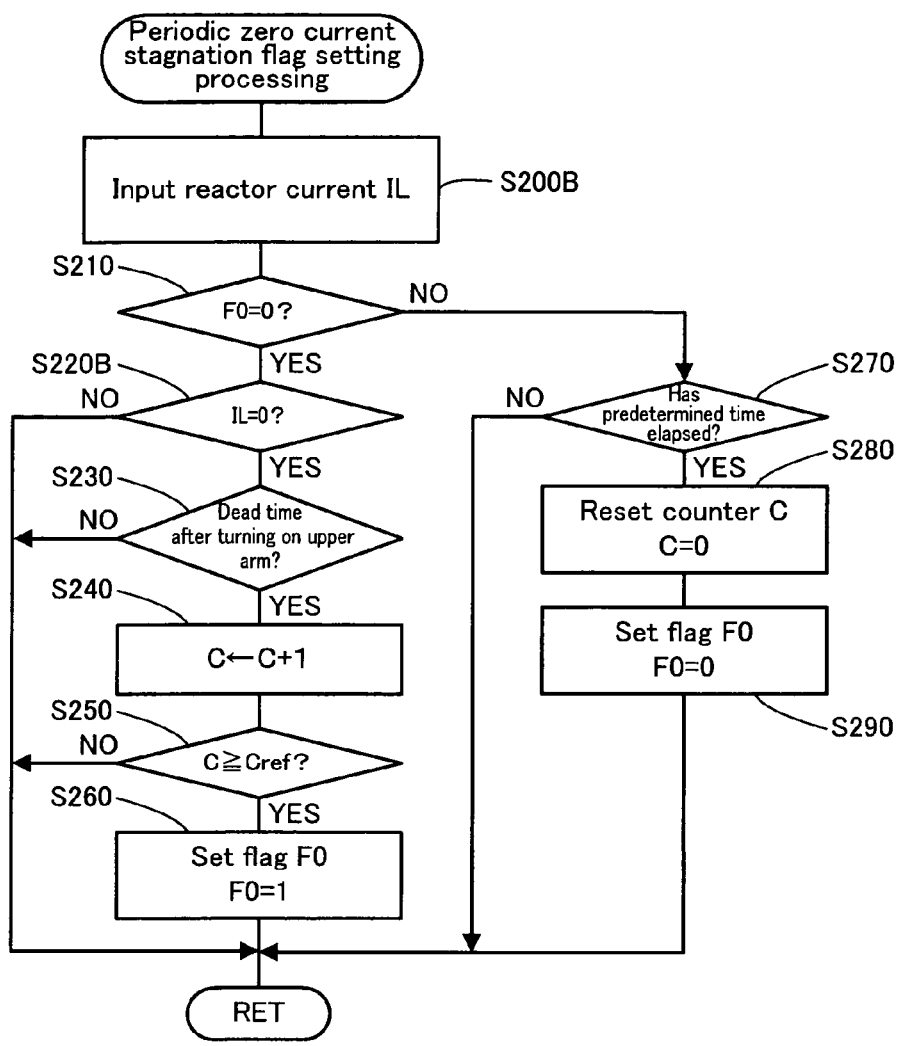
FIG. 14 is a flowchart of an example of a periodic zero current stagnation flag setting processing of the power supply device 20B of the variant.

In the power supply device 20 of the embodiment, the periodic zero current stagnation state is determined when it is determined that the battery voltage Vb and the lower arm voltage Vo are matched more than once. However, the periodic zero current stagnation state may be determined when it is determined that the current (reactor current) flowing through the coil 32 becomes the value of 0 more than once. In this case, as shown in a power supply device 20B of a variant in FIG. 13, a current sensor 26 is mounted in series with a coil 32 to input a sensor value to an unshown input port of an electronic control unit 50, and a periodic zero current stagnation flag setting processing in FIG. 14 is performed instead of the periodic zero current stagnation flag setting processing in FIG. 3. In the periodic zero current stagnation flag setting processing, a reactor current IL from the current sensor 26 is input (Step S200B) instead of the input of the battery voltage Vb and the lower arm voltage Vo, and it is determined whether the reactor current IL is a value of 0 (Step S220B) instead of the comparison of the difference between the battery voltage Vb and the lower arm voltage Vo with the threshold value Vref. This is because the zero current stagnation state is a state where the reactor current IL stagnates at a value of 0, and thus can be directly determined using the reactor current IL.

In the power supply device 20 of the embodiment, the periodic zero current stagnation state is determined to correct the voltage command Vh* downward only by the zero current stagnation state in the dead time immediately after the switching element Tr1 (upper arm) is turned off from on. However, the periodic zero current stagnation state may be determined to correct the voltage command Vh* downward by the zero current stagnation state in the dead time immediately after the switching element Tr2 (lower arm) is turned off from on, besides the zero current stagnation state in the dead time immediately after the switching element Tr1 (upper arm) is turned off from on. In this case, in the periodic zero current stagnation state at the time of the zero current stagnation state in the dead time immediately after the switching element Tr2 (lower arm) is turned off from on, the voltage command Vh* is unnecessarily corrected downward and output torque of the motors MG1 and MG2 is slightly reduced, but the degree thereof is small and such a phenomenon occurs in a short time, and thus no serious problem occurs.

In the power supply device 20 of the embodiment, the periodic zero current stagnation state is determined to correct the voltage command Vh* downward only by the zero current stagnation state in the dead time immediately after the switching element Tr1 (upper arm) is turned off from on. However, the periodic zero current stagnation state may be determined to correct the voltage command Vh* upward by the zero current stagnation state in the dead time immediately after the switching element Tr2 (lower arm) is turned off from on. This can prevent the output torque of the motors MG1 and MG2 from being slightly reduced in the periodic zero current stagnation state by the zero current stagnation state in the dead time immediately after the switching element Tr2 (lower arm) is turned off from on.

The power supply device 20 of the embodiment described above is connected to the two motors MG1 and MG2 via the inverters 11 and 12, but may be connected to one motor or three or more motors. The power supply device 20 may be connected to, not restrictive to the motor or the generator, any apparatus that consumes electric power or any apparatus that generates or regenerate electric power.

In the power supply device 20 of the embodiment, software determines the zero current stagnation state in the dead time immediately after the switching element Tr1 (upper arm) is turned off from on and determines the periodic zero current stagnation state to correct the voltage command Vh* downward. However, hardware may determine the zero current stagnation state in the dead time immediately after the switching element Tr1 (upper arm) is turned off from on and determine the periodic zero current stagnation state to correct the voltage command Vh* downward.

The best mode for carrying out the present invention has been described using the embodiment, but the present invention is not limited to the embodiment and may be, of course, carried out in various modes without departing from the gist of the present invention.

INDUSTRIAL APPLICABILITY

The present invention is applicable to production industries of power supply devices or the like.

The invention claimed is:

1. A power supply device that transmits electric power to and from an electrical apparatus, said power supply device comprising:
   a DC power supply;
   a boost converter that includes a first switching element connected in series with said electrical apparatus when viewed from said DC power supply, a second switching element connected in series with said first switching element and connected in parallel to said electrical apparatus when viewed from said DC power supply, and a reactor connected to a middle point between said first switching element and said second switching element and to an output terminal of said DC power supply, and can adjust on times of the switching elements at predetermined periods to increase a voltage of said DC power supply and supply the voltage to said electrical apparatus;
   a voltage smoothing unit that is connected in parallel to said electrical apparatus when viewed from said boost converter and smoothes a voltage applied to said electrical apparatus;
   a zero current stagnation state detecting module that detects a periodic zero current stagnation state where a zero current stagnation state, where a reactor current flowing through said reactor stagnates at a value of 0, occurs at said predetermined periods; and
   a control unit that controls said boost converter on the basis of a voltage command that is a target value of the voltage applied to said electrical apparatus and the periodic zero current stagnation state detected by said zero current stagnation state detecting module.

2. A power supply device according to claim 1, wherein said zero current stagnation state detecting module includes a power supply voltage detecting module that detects a power supply voltage that is a voltage of said DC power supply, and a second switch voltage detecting module that detects a second switch voltage that is a inter-terminal voltage of said second switching element, and detects said periodic zero current stagnation state, regarding a state where a difference between said detected power supply voltage and said detected second switch voltage is a predetermined voltage or lower as said zero current stagnation state.

3. A power supply device according to claim 2, wherein said zero current stagnation state detecting module detects said periodic zero current stagnation state when said zero current stagnation state occurs more than once.

4. A power supply device according to claim 1, wherein said zero current stagnation state detecting module includes a smoothing inter-terminal voltage detecting module that detects a smoothing inter-terminal voltage that is a inter-terminal voltage of said voltage smoothing unit, and a second switch voltage detecting module that detects a second switch voltage that is a inter-terminal voltage of said second switching element, and detects said periodic zero current stagnation state, regarding a state where a difference between said detected smoothing inter-terminal voltage and said detected second switch voltage is a first predetermined voltage or higher and said detected second switch voltage is a second predetermined voltage or higher at said predetermined periods as said zero current stagnation state.

5. A power supply device according to claim 4, wherein said zero current stagnation state detecting module detects said periodic zero current stagnation state when said zero current stagnation state occurs more than once.

6. A power supply device according to claim 1, wherein said zero current stagnation state detecting module includes a reactor current detecting module that detects said reactor current, and detects said periodic zero current stagnation state, regarding a state where said detected reactor current becomes a value of 0 at said predetermined periods as said zero current stagnation state.

7. A power supply device according to claim 6, wherein said zero current stagnation state detecting module detects said periodic zero current stagnation state when said zero current stagnation state occurs more than once.

8. A power supply device according to claim 1, wherein said control unit controls said boost converter on the basis of said voltage command when the periodic zero current stagnation state is not detected by said zero current stagnation state detecting module, and controls said boost converter on the basis of a post-correction voltage command corrected to reduce said voltage command when the periodic zero current stagnation state is detected by said zero current stagnation state detecting module.

9. A power supply device according to claim 8, wherein said control unit determines a direction of a polarity change of said reactor current and controls said boost converter on the basis of said determined direction of the polarity change.

10. A power supply device according to claim 9, wherein said control unit determines the direction of the polarity change on the basis of operation states of said first switching element and said second switching element.

11. A power supply device according to claim 10, wherein said control unit determines that said reactor current has changed in polarity from a current for discharging said DC power supply to a current for charging said DC power supply when said zero current stagnation state occurs in a dead time when said first switching element and said second switching element are both off immediately after said first switching element is turned off from on and thus said zero current stagnation state detecting module detects the periodic zero current stagnation state, and determines that said reactor current has changed in polarity from the current for charging said DC power supply to the current for discharging said DC power supply when said zero current stagnation state occurs in a dead time immediately after said second switching element is turned off from on and thus said zero current stagnation state detecting module detects the periodic zero current stagnation state.

12. A power supply device according to claim 9, wherein said control unit controls said boost converter on the basis of said post-correction voltage command when determining that said reactor current has changed in polarity from the current for discharging said DC power supply to the current for charging said DC power supply, and controls said boost converter on the basis of said voltage command, despite the detection of said periodic zero current stagnation state, when determining that said reactor current has changed in polarity from the current for charging said DC power supply to the current for discharging said DC power supply.

13. A power supply device according to claim 1, wherein said control unit controls said boost converter on the basis of the post-correction voltage command corrected to reduce said voltage command in a specific zero current stagnation state where said zero current stagnation state occurs in the dead time when said first switching element and said second switching element are both off immediately after said first switching element is turned off from on and thus said zero current stagnation state detecting module detects the periodic zero current stagnation state, and controls said boost converter on the basis of said voltage command when not in said specific zero current stagnation state.

14. A control method of a power supply device, said control method comprising:
a DC power supply;
a boost converter that includes a first switching element connected in series with an electrical apparatus that transmits electric power when viewed from said DC power supply, a second switching element connected in series with said first switching element and connected in parallel to said electrical apparatus when viewed from said DC power supply, and a reactor connected to a middle point between said first switching element and said second switching element and to an output terminal of said DC power supply, and can adjust on times of the switching elements at predetermined periods to increase a voltage of said DC power supply and supply the voltage to said electrical apparatus; and
a voltage smoothing unit that is connected in parallel to said electrical apparatus when viewed from said boost converter and smoothes a voltage applied to said electrical apparatus,
said control method comprising the steps of:
(a) determining whether said power supply device is in a periodic zero current stagnation state where a zero current stagnation state, where a reactor current flowing through said reactor stagnates at a value of 0, occurs at said predetermined periods, and
(b) controlling said boost converter on the basis of a voltage command that is a target value of the voltage applied to said electrical apparatus when it is determined that said power supply device is not in the periodic zero current stagnation state, and controlling said boost converter on the basis of a post-correction voltage command corrected to reduce said voltage command when it is determined that said power supply device is in the periodic zero current stagnation state.

15. A control method of a power supply device according to claim 14, wherein said Step (b) is the step of controlling said boost converter on the basis of said post-correction voltage command when said zero current stagnation state occurs in a dead time when said first switching element and said second switching element are both off immediately after said first switching element is turned off from on and thus it is determined that said power supply device is in said periodic zero current stagnation state, and controlling said boost converter on the basis of said voltage command, despite said power supply device being in said periodic zero current stagnation state, when said zero current stagnation state occurs in a dead time immediately after said second switching element is turned off from on and thus it is determined that said power supply device is in said periodic zero current stagnation state.

* * * * *